United States Patent
Li et al.

(10) Patent No.: US 12,149,075 B1
(45) Date of Patent: Nov. 19, 2024

(54) EXTENSIBLE AND DYNAMICALLY UPDATED ENERGY MANAGEMENT SYSTEM

(71) Applicant: Wattmore, Inc., Denver, CO (US)

(72) Inventors: Qiao Li, Denver, CO (US); Mahdi Motalleb, Denver, CO (US); Reza Ghorbani, Honolulu, HI (US)

(73) Assignee: Wattmore, Inc., Denver, CO (US)

( * ) Notice: Subject to any disclaimer, the term of this patent is extended or adjusted under 35 U.S.C. 154(b) by 0 days.

(21) Appl. No.: 18/665,147

(22) Filed: May 15, 2024

Related U.S. Application Data

(60) Provisional application No. 63/466,493, filed on May 15, 2023.

(51) Int. Cl.
  *H02J 3/00* (2006.01)

(52) U.S. Cl.
  CPC .............. *H02J 3/004* (2020.01); *H02J 3/003* (2020.01); *H02J 2203/10* (2020.01); *H02J 2203/20* (2020.01)

(58) Field of Classification Search
  CPC ........ H02J 3/004; H02J 3/003; H02J 2203/10; H02J 2203/20
  See application file for complete search history.

(56) References Cited

U.S. PATENT DOCUMENTS

| | | | | |
|---|---|---|---|---|
| 11,202,198 B1* | 12/2021 | Newman | ............... | H04L 61/10 |
| 2008/0077368 A1* | 3/2008 | Nasle | ............... | G05B 17/02 |
| | | | | 703/4 |
| 2011/0082596 A1* | 4/2011 | Meagher | ............ | H02J 13/00017 |
| | | | | 700/291 |
| 2011/0082597 A1* | 4/2011 | Meagher | ............ | H02J 3/38 |
| | | | | 700/291 |
| 2013/0204450 A1 | 8/2013 | Kagan et al. | | |
| 2015/0095009 A1* | 4/2015 | Brock | ............ | G06F 30/20 |
| | | | | 703/21 |
| 2017/0046458 A1* | 2/2017 | Meagher | ............ | G06F 30/20 |

(Continued)

OTHER PUBLICATIONS

International Searching Authority, International Search Report and Written Opinion, issued for International Application No. PCT/US2024/029463, mailed Aug. 1, 2024.

*Primary Examiner* — Ziaul Karim
(74) *Attorney, Agent, or Firm* — Polsinelli PC; Gregory P. Durbin

(57) ABSTRACT

An energy management system (EMS) and corresponding EMS manager are provided that provide improved extensibility and dynamic updating of models for predicting and optimizing power system management. In one aspect, an EMS predicts generation and consumption of a power system and optimizes operation of the power system using various forecasting and optimization models. The models may be managed and updated by the EMS manager based on data received from the EMS and other EMSs in communication with the EMS manager. The EMS manager may be configured to dynamically update and promulgate updates to models used by the EMS and other aspects of the EMS. The EMS may have an architecture including an application layer configured for the specific management system and a collection of updatable and expandable modules to facilitate forecasting, optimization, communication, and data management for the managed system.

3 Claims, 7 Drawing Sheets

(56) References Cited

U.S. PATENT DOCUMENTS

| | | |
|---|---|---|
| 2021/0003974 A1 | 1/2021 | Yang et al. |
| 2021/0158975 A1* | 5/2021 | Turney ................... G16Y 40/20 |
| 2021/0342836 A1* | 11/2021 | Cella .................... H04L 9/3239 |
| 2022/0108213 A1* | 4/2022 | Cao ........................ G06N 3/045 |
| 2022/0187847 A1* | 6/2022 | Cella ...................... G06Q 10/06 |
| 2022/0198562 A1* | 6/2022 | Cella ...................... G06Q 40/04 |
| 2023/0123322 A1* | 4/2023 | Cella ................. G06Q 30/0202 |
| | | 700/29 |

* cited by examiner

EXTENSIBLE AND DYNAMICALLY UPDATED ENERGY MANAGEMENT SYSTEM

CROSS-REFERENCE TO RELATED APPLICATION

This application is related to and claims priority under 35 U.S.C. § 119 (e) from U.S. Patent Application No. 63/466,493 filed May 15, 2023, entitled "Extensible and Dynamically Updated Energy Management System," the entire contents of which is incorporated herein by reference for all purposes.

FIELD

This disclosure relates to management of power systems and, in particular, an energy management system (EMS) having improved extensibility and dynamically updated forecasting and optimization functionality.

BACKGROUND

Modern power systems for buildings and other facilities regularly include a combination of power generation devices and power storage devices in addition to power-consuming loads. For example, many modern residential buildings include solar or wind power generators for renewably producing power and energy storage systems (e.g., batteries) for storing power generated by renewable energy systems or to facilitate energy arbitrage.

Despite their proliferation, such renewable energy projects and systems can be highly variable due to factors including, but not limited to the equipment in the system, the renewable energy sources available, the characteristics of the loads on the system, the communication protocols implemented by the devices in the system, and the control/management goals for the project. Environmental conditions can also play a substantial part in the effectiveness of a system given their impact on power generation (e.g., sunlight and wind conditions) and system loads (e.g., heating and air conditioning demands). Notably, these factors are often dynamic given changing weather patterns, improvements and changes in technology, and aging and wear of equipment within a given system.

The foregoing factors, among others, result in setup, operation, and management of power systems being a complex and resource-intensive undertaking. Accordingly, there is a need for a versatile energy management system that is easy to set up and configure for a wide range of power systems and that dynamically adjusts to changing power system and environmental conditions.

BRIEF SUMMARY

In one aspect of this disclosure, a computer-implemented method for managing equipment in a power system is provided. The method includes generating power forecast data for a power system using a forecasting model. The power forecast data includes predicted power consumption and generation data for the power system and the forecasting model receives power consumption and generation data for the power system as input and outputs the predicted power consumption and generation data. The method further includes generating a control parameter value for equipment of the power system using an optimization model. The optimization model receives the predicted power and generation data as input and outputs the control parameter value according to an optimization goal. The method also includes transmitting the control parameter value to the equipment to cause the equipment to operate according to the control parameter value.

In another aspect of this disclosure, a computer implemented method for managing multiple energy management systems (EMSs) is provided. The method includes receiving operational data for a power system managed by an EMS, wherein the EMS includes a forecasting model configured to receive power consumption and generation data for the power system as input and to output predicted power consumption and generation data and an optimization model configured to receive the predicted power consumption and generation data as input and to output a control parameter value for equipment of the power system according to an optimization goal. The method further includes determining an updated model parameter for a master model based on the operational data where the master model corresponds to one of the forecasting model and the optimization model. The method further includes transmitting the updated model parameter to the EMS. When the updated model parameter is received by the EMS, the EMS updates the one of the forecasting model and the optimization model according to the updated model parameter.

In yet another aspect of this disclosure, an EMS includes an application layer configured to communicate with equipment of a power system. The EMS also includes a logic layer accessible by the application layer. The logic layer includes (i) a forecasting module including a forecasting model callable by the application layer to generate predicted power consumption and generation data for the power system; (ii) an optimization module including an optimization model callable by the application layer to generate a control parameter value for controlling the equipment of the power system according to an optimization goal; and (iii) a communication module callable by the application layer to communicate with the equipment of the power system according to a communication protocol. In certain implementations, the application layer may further include a database module for facilitating database operation actions callable by the application layer to load, store, or manage data in one or more databases.

In some aspects, the forecasting module includes a plurality of forecasting models including the forecasting model, each forecasting model of the plurality of forecasting models selectively callable by the application layer to generate respective predicted power consumption and generation data. In some examples, the predicted power consumption and generation data is first predicted power consumption and generation data, the forecasting module is extensible by adding a new forecasting model to the forecasting module, and the new forecasting model is callable by the application layer to generate second predicted power consumption and generation data.

In other aspects, the forecasting module includes a plurality of optimization models including the optimization model, each optimization model of the plurality of optimization models selectively callable by the application layer to generate respective control parameter values. In some examples, the control parameter value is a first control parameter value, the optimization module is extensible by adding a new optimization model to the optimization module, and the new optimization module is callable by the application layer to generate a second control parameter value.

In various aspects: the forecasting module is extensible by adding the new optimization model without modifying the application layer, the logic layer further includes a data module callable by the application layer to access data from a data source; the data module is callable by the application layer to communicate with a plurality of database management systems; the data module is extensible to add functionality for communicating with a new database management system; the data module is extensible to add functionality for communicating with a new database management system without modifying the application layer.

In various aspects, the communication protocol is Modbus, Building Automation and Control Network (BACnet), LonTalk, or CANbus. The communication protocol may be one or more of a plurality of communication protocols and the communication module is callable by the application layer to communicate using any of the plurality of communication protocols. The communication module may be extensible to add functionality for communicating using a new communication protocol. The communication module may be extensible to add functionality for communicating using a new communication protocol without modifying the application layer.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
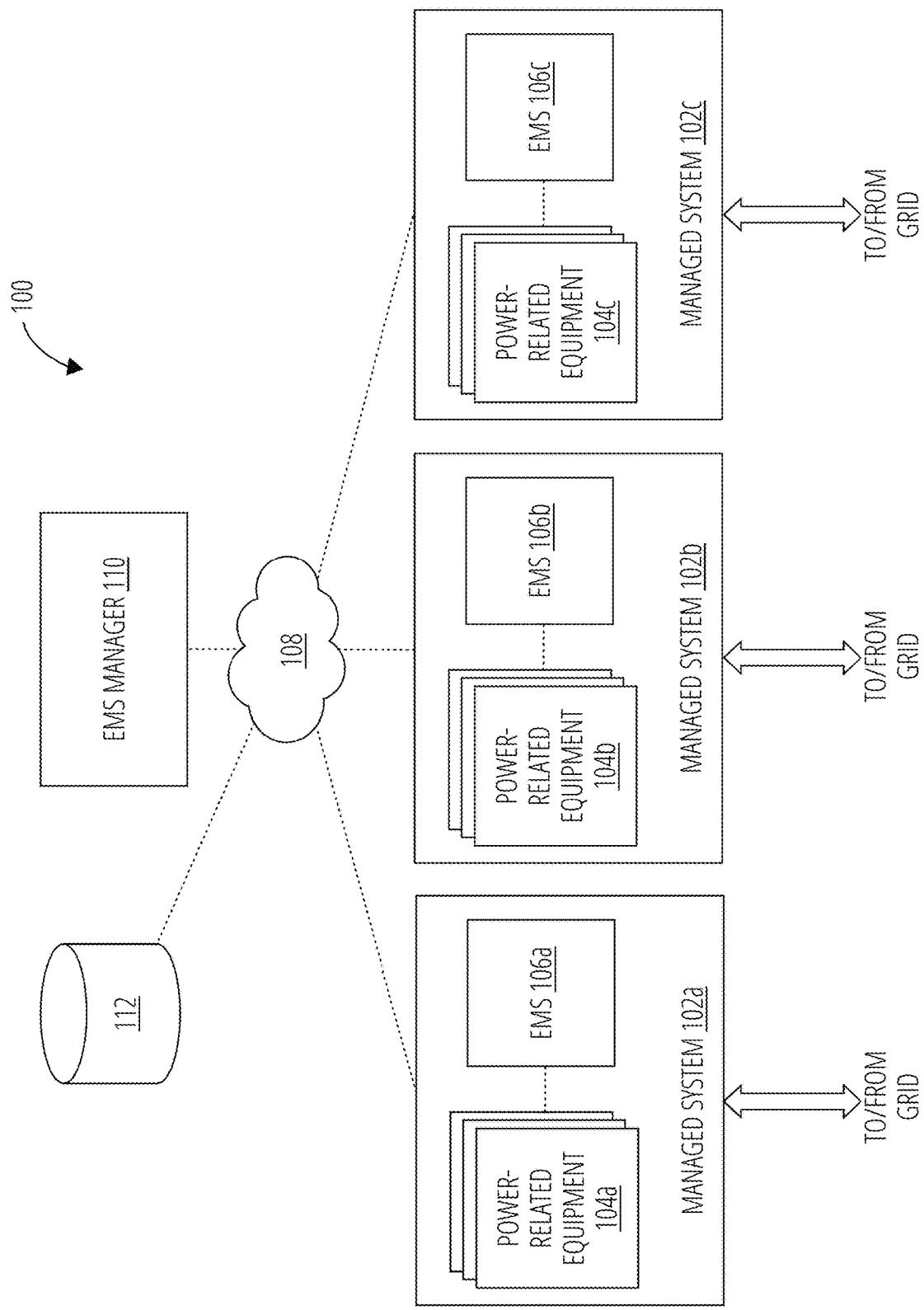
FIG. 1 is a schematic illustration of a power distribution and energy management environment according to an implementation of this disclosure.

Aspects of this disclosure are directed to energy management systems (EMSs) and related EMS managers for use in managing and optimizing power systems. In particular, the EMSs and EMS managers referenced in this disclosure include features and functions for obtaining and analyzing performance data for power systems, and generating and issuing control commands to optimize operation of the power systems according to various optimization goals. This disclosure also provides an EMS-related architecture that facilitates rapid deployment of new EMSs and improved extensibility of EMS features and functions.

For purposes of this disclosure, power systems including and managed by an EMS are generally referred to as "managed systems". While the specific configuration of a managed system may vary, the various aspects of this disclosure are, alone or in various possible combinations, particularly applicable to managed systems that include a combination of power generation, storage, and conversion equipment in addition to power consuming equipment/loads. As a result and by no means limited to the same, the systems and methods of this disclosure are particularly applicable to power systems for various types of commercial, residential and mixed developments including discrete buildings (e.g., apartment or other multi-dwelling buildings) that may include some form of renewable power generation (e.g., solar/photovoltaic panels or wind generators) and energy storage (e.g., batteries) and power conversion equipment (e.g., inverters) for storing and making use of the generated power.

Functionality of the disclosed EMSs is facilitated in part by various models that may be managed and dynamically updated by the EMS manager. Such models include forecasting models, which receive performance data for equipment of the managed system (which may include external data such as weather or power grid-related data) to predict power generated and consumed by the managed system. The EMSs further include optimization models for determining control parameter values for equipment of the managed system to achieve various optimization goals based on the forecasted data.

In at least some implementations, the EMS manager maintains master models and updates the master models based on actual power system performance data collected from EMSs overseen by the EMS manager. As a result, the EMS manager is able to draw on a substantial pool of real-world performance data to train and refine the master models. To the extent the EMS manager updates or changes a given master model, the EMS manager may readily promulgate the changes to connected EMSs, thereby ensuring that the EMSs include and are executing current versions of models.

EMSs according to this disclosure may include a software architecture directed to improving extensibility and updating of the EMS. In at least certain implementations, the EMS includes an application layer configured based on the corresponding managed system. Among other things the application layer interfaces with other devices, such as equipment of the managed system and coordinates operation of the EMS. The application layer is supported by various modules that, collectively, provide a toolkit for the application layer. For example, the modules may include various modelling-, communication-, and data-related modules, each of which includes a collection of functions and methods usable by the application layer to perform various functions. The modules function individually and collectively as a library of available functions and, as a result, facilitates easy installation and configuration of the EMS for different managed systems that may include different equipment, rely on different communication protocols, and the like. The application layer and modules are specifically configured such that the modules can be updated, modified, or added to (e.g., by the EMS manager), thereby expanding the tools available for the application layer to manage and operate the managed system. In certain implementations, the EMS may further include an EMS framework that includes certain common functions and methods relevant to multiple modules, such as those directed to error handling and fault detection.

Each of the foregoing aspects of this disclosure, among others, will not be discussed in further detail with reference to the accompanying figures.

FIG. 1 is a schematic illustration of an example environment 100 for power management. The environment 100 includes multiple managed systems, each of which includes respective power-related equipment and a respective energy management system (EMS). For example, managed system 102a is illustrated as including power-related equipment 104a and EMS 106a. Similarly, managed system 102b includes power-related equipment 104b and EMS 106b and managed system 102c includes each of power-related equipment 104c and EMS 106c. Each of the managed systems is further illustrated as being connected to a power grid (not shown) and communicatively coupled to an EMS manager 110.

For purposes of the following discussion, environment 100 is generally discussed with reference to managed system 102a and its components and operation. Unless otherwise indicated, any such discussion of managed system 102a is similarly applicable to managed system 102b and managed system 102c.

Managed system 102a generally represents any power system managed by an EMS (e.g., 106a). Managed system 102a is electrically coupled to and receives power from a broader power grid and includes one or more pieces of power-related equipment 104a that can be used to generate, store, or consume power. EMS 106a is communicatively coupled to at least some of power-related equipment 104a and is configured to monitor power-related activity and optionally to transmit control signals to the communicatively coupled power-related equipment 104a.

While the systems and methods discussed in this disclosure are not limited to any specific power system or application, this disclosure may refer to an apartment building power system including an EMS as an illustrative but non-limiting example of a managed system. Nevertheless, it should be appreciated that the concepts and implementations discussed in this disclosure can be adapted to any suitable power system regardless of the systems intended application. For example, in addition to apartment building power systems, aspects of this disclosure can be readily adapted for use in other residential applications including, but not-limited to, single family dwellings, multi-family dwellings, multi-unit housing complexes, mixed-use buildings, and the like. The concepts included in this disclosure can also be adapted for and are generally applicable to commercial and industrial applications, including those that may have specialized or unique power requirements (e.g., manufacturing/processing facilities with heavy equipment).

As noted above, power-related equipment 104a generally includes any equipment within 102a that may generate, consume, store, measure (e.g., a power meter) or convert power (e.g., a voltage or current transformer). For example, in the context of an apartment building, power-related equipment 104a for generating power may include rooftop photovoltaic (PV) panels, wind generators, and similar power generation systems. Non-limiting examples of power storage equipment may include batteries (e.g., lithium-ion or vanadium flow batteries), flywheel systems, and similar forms of energy storage. Power-related equipment 104a that consume power generally corresponds to any load of the managed system 102a. In the context of an apartment building, the most substantial of such equipment generally includes lighting systems, heating ventilation and air conditioning (HVAC) systems, and water heating systems, but may also include home appliances, vehicle charging stations, and other power-consuming devices and systems. Examples of power conversion equipment includes, among other things, inverters, transformers, converters, regulators, and similar equipment adapted to change characteristics (e.g., voltage, frequency, alternating current (AC)-to-direct current (DC)/DC-to-AC) of power within managed system 102a. Notably, certain equipment may be variable and operate in more than one of a generation, consumption, and storage mode. For example, an electric vehicle may consume power while charging but can also act as a power storage device.

As will be described in further detail below, EMS 106a monitors, analyzes, and controls operation of managed system 102a through interaction with power-related equipment 104a. To facilitate such management of power-related equipment 104a, EMS 106a includes forecast modelling functionality for predicting power generation and consumption of managed system 102a, and optimization functionality for determining how to control power-related equipment 104a to achieve various optimization goals. EMS 106a further includes communication functionality to facilitate collection of data from and sending of control commands and parameters to power-related equipment 104a.

As shown in FIG. 1, managed system 102a is in communication with an EMS manager 110 over a network 108. In certain implementations, network 108 may correspond to the Internet; but is more generally intended to represent any combination of networks and sub-networks for facilitating communication between EMS manager 110 and one or more EMSs. In at least certain implementations, EMS manager 110 may be a cloud-based system or similar distributed platform remotely executed and maintained relative to any specific managed system. In such implementations, EMS manager 110 may communicate with and coordinate EMSs in managed systems that are geographically disparate, operated by different entities, or otherwise independent of each other. In other implementations, EMS manager 110 may be implemented locally within a managed system or otherwise maintained on a private or semi-private network, e.g., to coordinate and manages EMSs for a particular organization, geographic area, or similar grouping of power systems.

Among other things, EMS manager 110 supports EMS 106a by managing and updating models used by EMS 106a, such as for forecasting and optimization. So, for example, EMS manager 110 may maintain master versions of models and update the models based on data received from EMS 106a of managed system 102a and other EMSs managed by EMS manager 110. EMS manager 110 may also provide additional functionality, such as, but not limited to providing a portal or other interface through which an operator of EMS 106a may access and configure EMS 106a; storing and managing account-related information for operators of managed systems supported; and facilitating payment for functions and services associated with EMS manager 110.

FIG. 1 further illustrates an external data source 112 accessible by network 108. While illustrated as a single element, external data source 112 is intended to represent any external source of data accessible and usable by EMS 106a and/or EMS manager 110. As noted above, EMS 106a generally operates power-related equipment 104a based on forecasting and optimization models. While at least some of the forecasting and optimization models may rely exclusively on operational data collected by EMS 106a from equipment of managed system 102a, in at least certain implementations, EMS 106a may further rely on external data. For example, EMS 106a may rely on weather forecasts or similar environmental data (e.g., to predict power generation (e.g., for solar- or wind-based generators) or consumption (e.g., heating and A/C demand)). As another example, EMS 106a may rely on external data regarding grid capacity, energy cost, grid power makeup (e.g., a percentage of grid power provided by renewable sources), and grid-related events such as rolling blackouts, outages, and the like. As yet another example, EMS 106a may be configured to retrieve equipment characteristics and performance data from an external database, e.g., in response to new equipment being added to managed system 102a. In any of the foregoing examples, among other cases, EMS 106a may access and ingest data from external data source 112 for purposes of forecasting or optimizing operation of managed system 102a. Similarly, EMS manager 110 may access similar data from external data source 112 for purposes of managing and updating any relevant models. In at least certain implementations, EMS manager 110 may retrieve and store information from external data source 112 accessible by and in a format usable by EMS 106a, thereby eliminating the need for each EMS to individually access, retrieve, and format data from the external data source 112.

While FIG. 1 illustrates environment 100 as including three managed systems, implementations of this disclosure are generally scalable and may include any number of managed systems. Similarly, while environment 100 includes one instance of EMS manager 110 for supporting the EMSs of the managed systems, this disclosure contemplates that systems according to this disclosure may include any suitable number of EMS managers to support the EMSs of any combination of managed systems.

As shown in FIG. 1, managed system 102a is electrically coupled to a power grid, such as a power grid managed by a utility company. This disclosure contemplates that a given EMS manager 110 be implemented to manage systems coupled to different grids. (which may be the same or different power grids depending on various factors such as the geographic location the managed systems). By way of non-limiting example, a power grid may be a primary source of power for managed system 102a (e.g., with power-related equipment 104a being operated by EMS 106a to peak-shave, engage in energy arbitrage, or otherwise optimize power drawn from the grid). In other implementations, managed system 102a may rely on power generation equipment of managed system 102a as a primary power source but may rely on a power grid for shortcomings of the power generation equipment or for emergency purposes. While power grids in this disclosure are generally described as utility-operated power grids, this disclosure contemplates that aspects of this disclosure may also be implemented in and applicable to microgrids or similar small scale/localized power grids whether they are standalone electrical grids or connected to a broader utility-operated power grid. Moreover, this disclosure also contemplates that managed system 102a may be a standalone system not connected to an external power grid (whether utility-scale or a microgrid) with EMS 106a and EMS manager 110 still implemented to monitor and control operation of managed system 102a.

Figure 2:
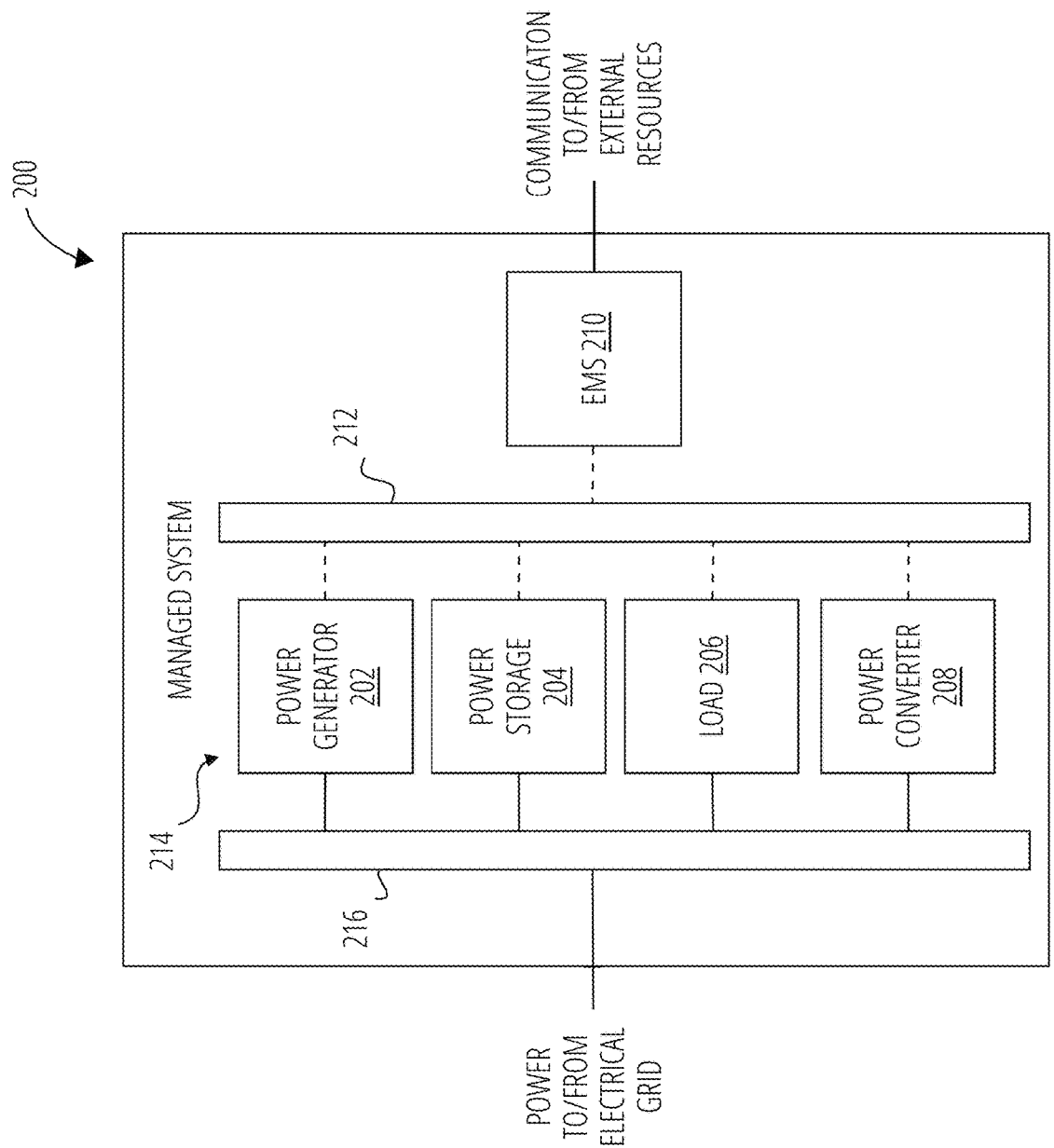
FIG. 2 is a schematic illustration of an example system managed by an energy management system (EMS) and that may be included into the environment of FIG. 1.

FIG. 2 is a block diagram of a managed system 200, which may generally correspond to any of the managed systems of environment 100 of FIG. 1. The managed system 200 includes a power generator 202, a power storage 204, a load 206, a power converter 208, an EMS 210, a communication network 212, and a power distribution network 216. For simplicity, each of power generator 202, power storage 204, load 206, and power converter 208 (which are collectively indicated as power-related equipment 214) are illustrated as single elements; however, it should be appreciated that a given managed system may include one or more of any of power generator 202, power storage 204, load 206, and power converter 208. Also, certain implementations of this disclosure may omit any of power generator 202, power storage 204, load 206, and power converter 208 if the corresponding functionality is not available within managed system 200. For example, a managed system without power generation equipment may include only EMS 210 and one or more loads (e.g., load 206) and omit the other elements illustrated in FIG. 2.

Although not illustrated in FIG. 2, managed system 200 may also include or be coupled to one or more pieces of equipment for measuring power within managed system 200 or for measuring power transferred between managed system 200 and the electrical grid. For example, any of power generator 202, power storage 204, load 206, or power converter 208 may be electrically coupled to a respective or shared power meter configured to measure power generated or consumed by the corresponding piece of equipment. Similarly, a power meter may be positioned between the power grid and power distribution network 216 of managed system 200 to measure power drawn from or suppled back to the power grid. In certain implementations, such a meter may be integrated into managed system 200. Alternatively, the meter may be a separate piece of equipment installed between managed system 200 and the power grid and may correspond to a utility-provided and managed meter. Regardless of where the meter is positioned relative to managed system 200 and the nature of the power measured by the meter, EMS 210 may be configured to be in communication with and receive meter readings or similar data form the power meter to supplement data collected from the other equipment of managed system 200.

The illustration of managed system 200 in FIG. 2 further includes simplified versions of communication network 212 and power distribution network 216. In general, communication network 212 corresponds to any of one or more communication networks within managed system 200 that facilitate communication between EMS 210 and power-related equipment 214. Communication network 212 may include any wired or wireless communication system including any necessary equipment for operating the network, such as, but not limited to routers, switches, bridges, repeaters, access points, and the like. Moreover, communication network 212 may support one or more communication protocols. By way of non-limiting example, communication network 212 may facilitate communication using any of Building Automation and Control Network (BACnet), LonTalk, Modbus, CANbus, or any other communication protocol supported by one or more of power-related equipment 214. More generally, communication network 212 is intended to represent any communication network that enables unidirectional and/or bidirectional communication between EMS 210 and power-related equipment 214.

In general, EMS 210 is configured to collect operational data for power-related equipment 214 over communication network 212 and to issue control commands to power-related equipment 214 over communication network 212. This disclosure contemplates that certain pieces of power-related equipment 214 may only support one of these two functions. For example, EMS 210 may be able to collect operational data from a piece of power-related equipment 214 but may not be able to directly control the piece of power-related equipment 214 or vice versa.

Like communication network 212, power distribution network 216 is illustrated in FIG. 2 as a singular network for distributing power from a power grid and between power-related equipment 214. More generally, power distribution network 216 is intended to represent one or more networks for distributing power to, from, and within managed system

200. So, while illustrated as a single, bus-based distribution system, power-related equipment 214 may more generally include multiple independent or interconnected circuits for distributing power within managed system 200. While not illustrated, power distribution network 216 should be assumed to include circuit breakers, fuses, panels/sub-panels, meters, switch gear, transformers, and other related equipment for distributing power within managed system 200.

As previously discussed in the context of power-related equipment 104a of FIG. 1, implementations of this disclosure are intended to be versatile and to work with a wide range of power-related equipment. However, in general, power generator 202 represents one or more power generation devices in communication with EMS 210 over communication network 212 and configured to generate and provide power over power distribution network 216. By way of non-limiting example, power generator 202 may include one or more of a photovoltaic (PV) array, a wind turbine/generator, a fuel cell, or a micro-hydro system. Notably, implementations of this disclosure are not limited to power generator 202 being a renewable form of energy and, as a result, power generator 202 may include gas or diesel powered generators and other similar non-renewable energy sources. While the majority of the discussion in this disclosure assumes that managed system 200 is relatively small scale (e.g., a single family home or apartment building) and that power generator 202 is on a similar scale, in certain implementations, power generator 202 may be a more substantial source of power, such as, but not limited to a solar or wind farm, a gas turbine, a hydroelectric power system, or other power source.

Power storage 204 represents one or more power storage devices in communication with EMS 210 over communication network 212 and configured to receive and discharge power over power distribution network 216. The majority of this disclosure generally uses or implies the use of a battery or battery bank for power storage 204; however, this disclosure more broadly contemplates that power storage 204 may include any suitable form of power storage. For example, this disclosure contemplates that power storage 204 may include any suitable form of electrochemical storage (e.g., batteries or hydrogen fuel cells), mechanical storage (e.g., flywheels, or pump hydro power systems), thermal storage, etc., suitable for use in the particular application of managed system 200.

Power converter 208 is also intended to represent one or more pieces of power conversion equipment for use in managed system 200. In general, power converter 208 is provided to modify power distributed by power distribution network 216 according to the needs of power-related equipment 214 and in communication with EMS 210. By way of non-limiting example, power converter 208 may include one or more of a converter (e.g., an AC-to-DC converter or DC-to-DC converter), an inverter (e.g., a DC-to-AC inverter), a transformer, a rectifier, or similar equipment for changing the voltage, amperage, frequency, or type of power distributed through power distribution network 216. Notably, while power converter 208 is shown as being connected to power distribution network 216 in a bus-style arrangement in FIG. 2, in other implementations, power converter 208 may be connected in-line with power generator 202, power storage 204, or load 206. For example, power converter 208 may be an inverter in line with either of power generator 202 or power storage 204 for converting DC power provided by power generator 202 or power storage 204 into AC power.

Finally, load 206 is intended to represent one or more loads of managed system 200 in communication with EMS 210. This disclosure is not limited to any specific quantity or type of loads and is generally applicable regardless of the power needs of any load within managed system 200. As previously discussed, loads typically managed by an EMS system include, without limitation, HVAC systems and lighting systems; however, these examples should not be considered limiting to the loads that may be included as load 206.

Figure 3:
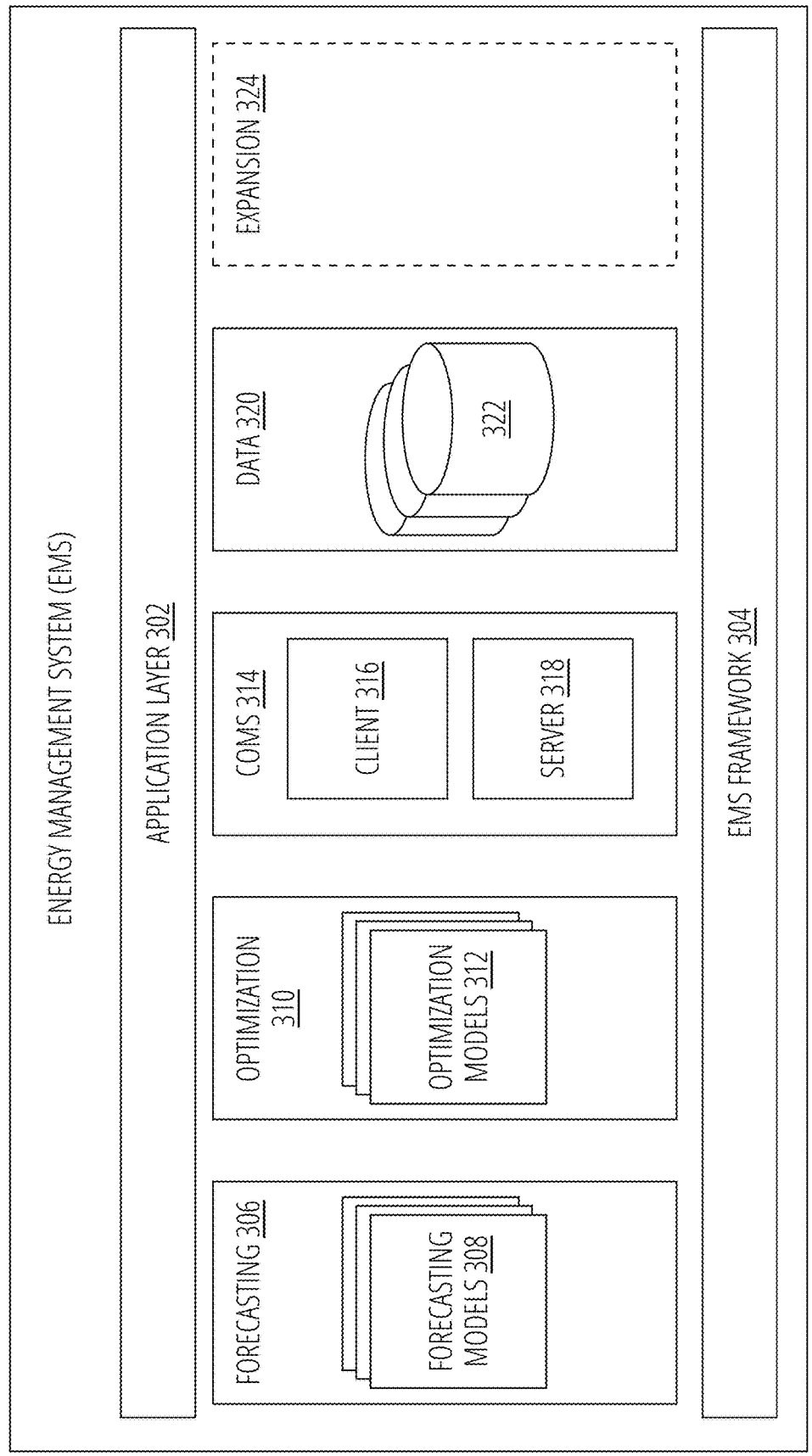
FIG. 3 is a schematic illustration of an EMS for updating and coordinating EMSs, such as the EMS of FIG. 2.

FIG. 3 is a block diagram illustrating an EMS 300 according to this disclosure. With reference to the previous figures, EMS 300 may generally correspond to EMS 106a of FIG. 1 or EMS 210 of FIG. 2.

The specific functions performed and data collected by EMS 300 will vary depending on the nature of power-related equipment included in a managed system in which EMS 300 is incorporated. However, in general, EMS 300 may monitor amounts, trends, and characteristics of power produced by power-generating equipment, stored and discharged by power storage equipment, and consumed by loads of the managed system. EMS 300 may also monitor and analyze operation of any power conversion equipment of the managed system. Based on the data collected, EMS 300 may subsequently transmit control commands/parameters to any controllable power-related equipment within the managed system to achieve various operational goals.

As illustrated, EMS 300 includes a forecasting module 306, an optimization module 310, a communications module 314, and a data module 320. EMS 300 is further illustrated as being expandable to include additional modules by expansion 324. EMS 300 further includes an application layer 302 and an EMS framework 304, which support various functions of the modules included in EMS 300.

Forecasting module 306 generally includes code for predicting power consumption and generation data for a managed system within which EMS 300 is incorporated. To do so, forecasting module 306 may include one or more forecasting models 308 configured to receive power-related data as input and to output the predicted power consumption and generation data for some future time period. So, for example, EMS 300 may periodically collect operational data from power-related equipment of the managed system and provide the operational data (or summary data derived from the collected data) to forecasting models 308. Forecasting models 308 in turn output predictions for power generated by any power generators within the managed system and power consumed by loads of the managed system.

In certain implementations, forecasting models 308 may be configured to provide predictions based only on the operational data collected from the managed system. In other implementations, forecasting models 308 may further consider other factors external the managed system, such as grid and environmental conditions. In such implementations, EMS 300 may be configured to collect and store such data (e.g., by retrieving the data from an external data source, such as external data source 112 shown in FIG. 1) in a manner tied to any collected operational data.

In one specific example, EMS 300 may be integrated into a managed system including a PV array for generating power and a load including an HVAC system. EMS 300 may collect data regarding the power generated by the PV array and consumed by the HVAC system over time in addition to external data regarding historic and forecasted weather patterns (e.g., amount of daylight, cloud cover data, etc.). Forecasting models 308 may subsequently receive the power consumption and generation data and external data and output predicted power consumption and generation data for a future time period, such as the upcoming 24 hours.

In one specific example, forecasting models 308 may include a neural network (NN) and may include each of a long-term forecasting model and a short-term forecasting model. So, for example, in a managed system including a solar/PV system, the long-term forecasting model may receive as historic power generation and load data on a daily basis in order to capture long-term and relatively high-level power generation and loading trends for the managed system. In contrast, the short-term forecasting model may rely on higher resolution data (e.g., hourly generation and loading data) for a shorter time frame (e.g., the past few days or week) to detect more immediate changes and trends. The results of each of these models may be combined by forecasting module 306 to produce a final prediction of power generation and consumption for a future time period (e.g., the next 24-hours).

As noted, EMS 300 may also issue control commands to power-related equipment within a managed system. The control commands may generally include control parameter values for modifying operation of one or more pieces of the power-related equipment. In at least certain implementations, EMS 300 is configured to generate control commands and the corresponding control parameter values based on each of the predicted power consumption and generation data provided by forecasting models 308 of forecasting module 306 and one or more optimization goals. More specifically, EMS 300 may collect power consumption and generation data for the managed system and, using one or more of forecasting models 308, generate predicted power consumption and generation data for a future time period. The predicted power consumption and generation data may then be provided to an optimization module 310 including one or more optimization models 312 that subsequently output control parameter values for the power-related equipment of the managed system. Optimization models 312 may also generate scheduling data, such as a dispatch schedule, indicating when the different control parameter values should be implemented by a give piece of the power-related equipment. So, for example, in implementations in which forecasting module 306 is configured to generate predicted power consumption and generation data for an upcoming 24-hour period, optimization module 310 may be configured to output a schedule for operation of the power-related equipment including when control commands to apply certain control parameter values are to be implemented by the power-related equipment. In certain implementations, dispatch schedules may be communicated to controllable pieces of the power-related equipment for execution by the equipment. Alternatively, EMS 300 may execute the dispatch schedule by issuing control commands including relevant control parameter values to the pieces of power-related equipment 104a according to the timing included in the dispatch schedule.

In general, each of optimization models 312 of EMS 300 is configured to generate control parameter values/dispatch schedules according to a respective optimization goal. An optimization goal generally refers to a goal/target or operating policy related to energy/power management. One example optimization goal may be to minimize power consumed from the power grid or to maintain power consumed from the power grid below a certain threshold. By way of non-limiting example, when EMS 300 executes such an optimization model, the resulting control parameter values and dispatch schedule output by the optimization model may be directed to managing operation of power-related equipment to try and meet the power consumption requirements of managed system 102a with the power generated and stored by the managed system.

Another optimization goal may be to minimize or reduce cost of power consumed from the power grid. By way of non-limiting example, when EMS 300 executes such an optimization model, the resulting control parameter values and dispatch schedule output by the optimization model may be directed to peak-shaving or otherwise reducing the amount of power drawn from the power grid during peak demand periods or similar periods typically associated with high energy prices. In certain implementations, the optimization model may also provide control parameter values/ dispatch schedules to perform energy arbitrage, e.g., by drawing power from the power grid to charge batteries or otherwise store energy during off-peak hours.

As yet another example, an optimization goal may be to minimize or reduce emissions associated with power consumed by the managed system. By way of non-limiting example, when EMS 300 executes such an optimization model, the resulting control parameter values and dispatch schedule output by the optimization model may be directed to limiting power drawn from the power grid during hours or time periods when power provided by the power grid is likely to be generated using "dirty"/non-renewable energy sources, such as fossil fuels or coal. For example, the optimization model may generate control parameter values to proactively charge energy storage systems of the power-related equipment to capacity based on forecasts of weather (e.g., substantial precipitation or cloud cover or low winds) that may negatively impact the proportion of provided by the power grid provided from renewable sources.

In certain implementations, optimization module 310 is generally configured such that EMS 300 may readily change optimization goals, e.g., in response to commands from an operator. Accordingly, EMS 300 may maintain a library of optimization models, each of which may be configured to generate control schemes directed to respective optimization goals. EMS 300 may also be configured to operate using a particular optimization goal by default. For example, in one implementation of the present disclosure, the default optimization goal may be to minimize cost taking into account both a Time of Use (TOU) price and a demand charge price with a customizable tariff structure.

As noted above, forecasting module 306 generally includes one or more forecasting models 308 while optimization module 310 includes one or more optimization models 312 for providing the outputs noted above. This disclosure is not limited to any specific type of model and various models and model types can be readily adapted in implementations of this disclosure. For example, in certain implementations, forecasting models 308 may include one or more regression-type models that attempt to quantify the predicted amount of power generated or consumed for a given time period. In other implementations, forecasting models 308 may be classification-type models that provide a general classification of power consumption and generation for the time period. So, for example, a forecasting model may classify a cold and cloudy day as being "high consumption/low generation" due to increased demand for heating and reduced solar generation resulting from the weather conditions. Similarly, optimization models 312 may include regression-type models that output specific control commands or parameter values for operating power-related equipment to achieve various optimization goals. Alternatively, optimization models 312 may include models for classifying the predicted power and generation data from forecasting module 306 into various operational states or modes of the managed system for achieving the optimization goals.

As will be discussed below in further detail in the context of FIG. 4, models and algorithms of EMS 300 are generally defined by various model parameters. In certain implementations, EMS 300 may include functionality to train and update its models and algorithms based on operational data collected from the manages system, external data collected and used by EMS 300, and comparisons of actual system performance versus the intended optimization goal. Model parameters may also be updated in response to update messages received from an EMS manager, such as EMS manager 110 of FIG. 1. For example, EMS manager 110 may be configured to collect and analyze data from multiple EMSs and external data sources to train master versions of forecasting and optimization models. EMS manager 110 may be further configured to transmit updates (including changes to model value parameters and/or new models) to EMSs overseen by EMS manager 110 to ensure that the EMSs are operating with accurate and dynamic models.

In certain implementations, the models of forecasting module 306 and optimization module 310 may be maintained in a model library or may be user configurable. For example, EMS 300 may maintain a collection of models for different system configurations and arrangements of power-related equipment. Similarly, EMS 300 may permit a user to build and configure a model for a managed system, including adding, removing, and modifying aspects of the model related to specific power-related equipment as the equipment is added, removed, or modified.

Communications module 314 include functionality for facilitating communication between EMS 300 and power-related equipment within the managed system. For example, communications module 314 of EMS 300 may include code for communicating via one or more of Building Automation and Control Network (BACnet), LonTalk, Modbus, CAN-bus, or any other communication protocol supported by one or more of the power-related equipment. As shown in FIG. 3, communications module 314 may be configured to include code to operate as each or either of a communication client 316 or a communication server 318 depending on the protocol required for communicating with given pieces of power-related equipment. In at least one specific implementation, communications module 314 may include at least code for communicating via the Modbus protocol and communication client 316 and communication server 318 may be configured to function as a Modbus client and a Modbus server, respectively.

EMS 300 further includes data module 320, which generally includes one or more data sources 322 for storing data relevant to operation of EMS 300. For example, data sources 322 may store operational data obtained from power-related equipment of the managed system and external data (e.g., weather- or grid-related data) obtained from external sources for purposes of forecasting or optimization. Data sources 322 may also include data describing the managed system and its components. For example, data sources 322 may include profiles for power-related equipment of the managed system that include descriptions or identifying information for the equipment (e.g., make, model, type), performance specifications for the equipment, and actual performance data for the equipment collected over time by EMS 300. Among other things, such data may be used to develop and refine the various models relied on by EMS 300 and, in some instances, may be exported to the EMS manager associated with EMS 300 to refine its master models and create libraries of equipment data to help users build and configure their managed systems within EMS 300. In addition to databases for storing data collected by or relevant to operation of EMS 300, data module 320 may further contain code for accessing and modifying data maintained in the databases.

Data module 320 may be configured to operate using any suitable database type depending on the particular needs and use of the data being stored. For example, data sources 322 may include relational databases, hierarchical databases, network databases, graph databases, object-oriented databases, or NoSQL databases depending. Data module 320 may further include code and functionality for communicating with one or more database management systems, such as, but not limited to, Postgres and MySQL.

In certain implementations, data module 320 may not include any databases or data sources itself but may include functionality for communicating with one or more databases accessible by EMS 300. For example, in such implementations data module 320 may include executable code, processes, and routines for facilitating communication between EMS 300 and databases accessible by EMS 300, e.g., databases installed in the operating system on which EMS 300 is running. To accommodate the range of database formats and types, data module 320 may include a library of code and functionality for communicating with multiple database types. Similarly, data module 320 may be extensible such that as new database formats and types are developed and/or supported by EMS 300, data module 320 may be expanded and supplemented with code and functionality directed to the newly supported database types.

As shown in FIG. 3, EMS 300 further includes an application layer 302. In general, application layer 302 includes the primary logic for controlling and interacting with the managed system. In contrast, the various modules of EMS 300 function as a library of tools and data for use by application layer 302. Application layer 302 is configured specifically for the managed system including EMS 300 based primarily on the equipment included in the managed system and the particular objectives for operation of the managed system. In contrast, the various modules of EMS 300 discussed above function as a toolkit or software development kit of callable functions and data available to the application layer 302 for monitoring and operating the managed system. Stated differently, the various modules of EMS 300 may be considered a combination of a logic layer including the functions and methods relied on by the EMS and a data layer including the data on which the functions and methods of the logic layer act. Accordingly, in certain implementations, application layer 302 may include a task management system for scheduling operation of the various modules of EMS 300.

Among other things, the foregoing arrangement facilitates rapid deployment and modification of managed systems. For example, when installing and implementing EMS 300, application layer 302 may be effectively configured by indicating the power-related equipment within the managed and indicating a particular optimization goal for EMS 300. Subsequently, application layer 302 may rely on the information provided during setup to access and execute the necessary code from the module library. So, for example, during setup a user may indicate that the power-related equipment of the managed system includes each of a PV array, an inverter, and a battery energy storage system communicatively coupled to EMS 300 using Modbus protocol and that the managed system should be operated to minimize cost. In response application layer 302 may access the relevant functions of communications module 314 for communication over Modbus to request and receive operational data from the power-related equipment and call the relevant forecasting and optimization models for generating a dispatch schedule corresponding to minimizing power costs for the managed system over a future time period.

EMS 300 further includes EMS framework 304. In general, EMS framework 304 includes code that may be necessary or useful to multiple modules. By way of non-limiting example, EMS framework 304 may include code and functionality related to error handling and fault detection.

EMS 300 is generally intended to be modular and extensible, particularly as new power-related equipment and/or functionality develops and is implemented into managed systems. To reflect this extensibility, EMS 300 is illustrated in FIG. 3 as including an expansion 324. As previously noted, the various modules of EMS 300 are intended to provide a toolkit for application layer 302 to perform its various functions. Accordingly, as new functionality is needed or new power-related equipment is to be supported by EMS 300, the code contained and maintained by EMS 300 can be expanded simply by adding new modules to EMS 300, thereby expanding the toolkit available to application layer 302. Stated differently, the functionality and features of EMS 300 can be readily expanded and developed without substantially altering the fundamental operation of EMS 300 or application layer 302.

Figure 4:
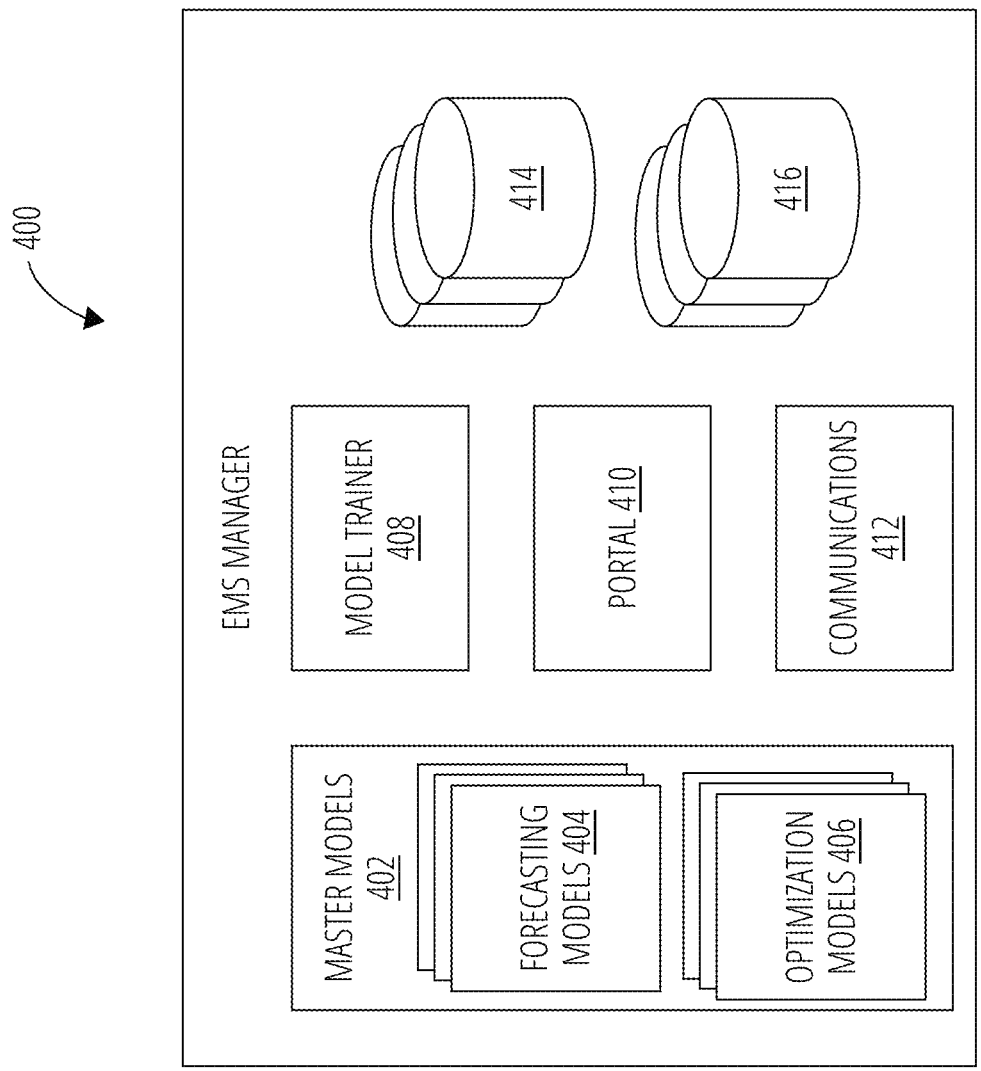
FIG. 4 is a schematic illustration of an EMS manager for updating and coordinating EMSs, such as the EMS of FIG. 3, and which may be included in the environment of FIG. 1.

FIG. 4 is a block diagram illustrating and example EMS manager 400 according to this disclosure. EMS manager 400 generally corresponds to EMS manager 110 of FIG. 1. As shown, EMS manager includes master model collection 402, a model trainer 408, a portal module 410, and a communications module 412. EMS manager 400 may further include various data sources, such as historical data 414 and system data 416, which will be discussed below in further detail.

In certain implementations, EMS manager 400 coordinates monitoring, updating, and general management of EMSs. Among other things, EMS manager 400 may facilitate management and updating of the various models relied on by the EMSs to forecast power consumption and generation and to optimize operation of managed systems. To do so, EMS manager 400 may maintain a library of "master" models, each of which is a centralized and controlled version of a corresponding model usable by the EMS (e.g., a forecasting or optimization model). As shown in FIG. 4, for example, master model collection 402 includes each of forecasting models 404 and optimization models 406, each of which are intended to represent a collection of master models for forecasting and optimization functions, respectively. Accordingly, EMS manager 400 may transmit (e.g., periodically or in response to changes to the master model) updated model parameters, model version, etc., to EMSs overseen by EMS manager 400 to ensure that the EMSs include and execute current and accurate models.

This disclosure contemplates EMS manager 400 may also facilitate In at least certain implementations, new models may be added to master model collection 402 over time. Following addition of a new model, EMS manager 400 may export the new model to each connected EMS, thereby enabling access to and implementation of the new model.

In addition to updating existing models and adding new models, EMS manager 400 may also facilitate distribution of other upgrades and modifications to EMSs overseen by EMS manager 400. For example, and without limitation, such upgrades and modifications may include software or firmware upgrades. Such upgrades may include additions or changes to the various modules and tools of the EMS (including the addition of entirely new modules and removal of existing modules), changes and upgrades to the EMS application layer, and changes and upgrades to the EMS framework.

EMS manager 400 may include functionality to update and refine the various models included in master model collection 402. Such functionality is generally represented in FIG. 4 by model trainer 408. In certain implementations, model trainer 408 may update the various mater models based on actual operational data received from EMSs overseen by EMS manager 400. For example, an EMS in communication with EMS manager 400 may transmit predicted power consumption and generation data and corresponding optimization model outputs (e.g., control parameter values or dispatch schedules) for a given time period along with actual performance data for the same time period. Such performance data may include, for example, actual power generation and consumption data and metrics relevant to the optimization goal sought to be achieved by the EMS (e.g., an actual cost of power or actual amount of power drawn from a power grid). To the extent the models rely on other data, such as weather or power grid data, such data may also be provided to EMS manager 400 by the EMS or obtained from an external data source by EMS manager 400. In at least certain implementations, EMS manager 400 may maintain the collected data in a corresponding data source, such as historical data 414.

EMS manager 400 may subsequently use the collected data to train and update the master versions of the relevant models. Following such updates, EMS manager 400 may also promulgate or otherwise make available the updated versions of the models for implementation in other EMSs overseen by EMS manager 400. In at least certain implementations, multiple EMSs may provide their data to EMS manager 400 on a periodic or occasional basis such that EMS manager 400 is provided with a consistently updated data collection for updating the master models. Doing so helps to ensure that the models maintained by EMS manager 400 are accurate and reflect current trends (e.g., weather trends, power cost and other power grid-related trends, etc.).

FIG. 4 further illustrates EMS manager 400 as including a portal module 410. Among other things, portal module 410 provides users with access to EMS manager 400 and features and functionality for analyzing performance of EMSs; generating reports, visualizations, and analytics for EMSs and managed systems; configuring EMSs; making payments for services provided through EMS manager 400; and other similar tasks.

This disclosure contemplates that portal module 410 may be configured to provide access to the features and functions of EMS manager 400 using any suitable approach. For example, portal module 410 may function as an application server configured to support an application executed on a user computing device, such as a smart phone or laptop. In other implementations, portal module 410 may support a web-based portal accessible by a browser or similar application executed on the user computing device.

Finally, EMS manager 400 is illustrated as including communications module 412, which generally provides an interface between EMS manager 400 and EMSs or other computing devices to facilitate the various functions of EMS manager 400 described herein.

The features and functionality provided by portal module 410 may be supported by a corresponding data source, which is indicated in FIG. 4 as system data 416. By way of non-limiting example, system data 416 may include account information for users of EMS manager 400 and associated EMSs, details for managed systems (e.g., amount and type of different power-related equipment included in the managed systems), historical reporting and analytics data, and the like. In at least certain implementations, system data 416 may also include a database of power-related equipment and performance specifications for the power-related equipment. Among other things, such information may be used to facilitate configuration and modelling of EMSs by allowing users to readily select the power-related equipment included in their managed systems and having the system automatically access and provide relevant performance data for purposes of forecasting and optimization.

Notably, while this section of the disclosure describes various functions and features provided by EMS manager 400, this disclosure contemplates that at least some of the features and functionality may instead be provided by each individual EMS, supplemental computing systems of managed systems, and/or distributed across multiple EMSs or associated computing systems. For example, at least some of the model training functionality may be performed by an EMS such that the models are uniquely trained for the managed system associated with the EMS. As another example, an EMS or a computing system in communication with an EMS may provide dashboarding, user portal, visualization, and related functionality for analyzing performance of the EMS and facilitating configuration of the EMS. To the extent the EMS provides any of the foregoing functionality, access to the EMS may similarly be facilitated by an application executed on a user computing device. In at least certain implementations, the EMS may also include suitable input and output devices (e.g., a screen/touchscreen, mouse or other pointer, keyboard, or any similar input out output device) for accessing features and functionality of the EMS.

Figure 5:
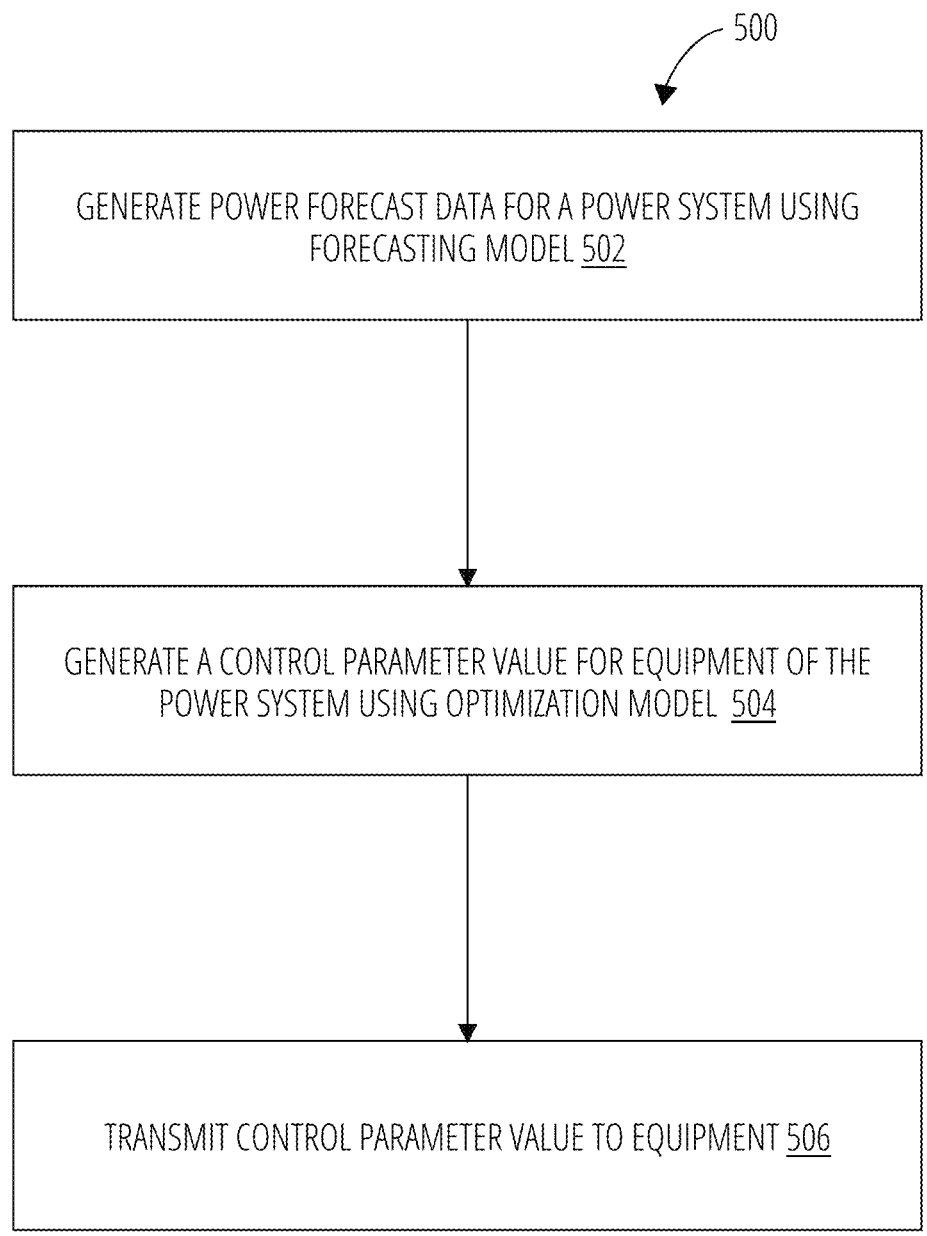
FIG. 5 is a block diagram illustrating a method of managing power in a system, which may be executed by an EMS, such as the EMS of FIG. 3.

FIG. 5 illustrates an example method 500 for monitoring and operating power-related equipment of a managed system. Method 500 may be a computer-implemented method executed, for example, by an EMS, such as EMS 106a of FIG. 1, EMS 210 of FIG. 2, or EMS 300 of FIG. 3. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, method 500 begins at step 502 with generating power forecast data for a power system using a forecasting model. As previously discussed in this disclosure, forecasting models of EMSs according to this disclosure (e.g., forecasting models 308 of EMS 300 shown in FIG. 3) are generally configured to receive, as input, power consumption and generation data for the managed system and to provide as out output predicted power consumption and generation data.

In certain implementations, the EMS may include multiple forecasting models, e.g., within a forecasting module. In such implementations, step 502 may include calling a specific forecasting model based on factors including, but not limited to, the power-related equipment within the managed system.

Step 502 of generating the power forecast data using the forecasting model may also include obtaining the power consumption and generation data for the power-related equipment included in the managed system. In general, the EMS may collect and store such data in a database or other data store (e.g., as implemented in a data module, such as the data module 320 of FIG. 3). This disclosure is not limited to any specific type of data collection method and acknowledges that the processes for data collection from equipment of the managed system may be dependent on the availability of data from the equipment, the communication protocols implemented to facilitate communication between the EMS and the equipment, and other factors.

At step 504, method 500 includes generating a control parameter value for equipment of the power system using an optimization model. As previously discussed in this disclosure, optimization models (e.g., optimization models 312 of EMS 300 shown in FIG. 3) are generally configured to receive, as input, the predicted power and generation data generated by the forecasting models (e.g., in step 502) and to provide as output a control parameter value for controlling operation of a piece of power-related equipment included in the managed system.

As previously discussed in the context of optimization module 310 of EMS 300, the optimization model may be one of multiple optimization models available to the EMS and each optimization model may correspond or include a respective optimization goal for generating the control parameter values for the power-related equipment of the managed system.

Also, generating the control parameter value may include generating discrete control signals/commands including the control parameter value and, in some cases, a time period during at or during which the control value parameter is to be applied. In at least some implementations, such control value parameters and timing information may be combined into a dispatch schedule or similar sequence of commands that includes a sequence of control parameter values for modifying operation of a piece of power-related equipment within the managed system and associated timing information. So, for example, the dispatch schedule may cover commands and control parameter values to be sent to or implemented by one or more pieces of the power-related equipment for a subsequent 24-hour period.

At step 506, method 500 includes transmitting the control parameter value generated in step 504 to the relevant equipment to cause the equipment to operate according to the control parameter value.

In certain implementations, transmitting the control parameter value may include transmitting a command from the EMS to a piece of the power-related equipment including the control parameter value. As noted above in the context of step 504, the EMS may be configured to send a series of such commands according to a dispatch schedule. So, for example, the optimization module may generate a dispatch schedule including the control parameter value and a time at which the control parameter value is to be applied. The EMS may then execute the dispatch schedule by transmitting a sequence of control messages according to the dispatch schedule, including a control message for applying the control parameter value at the corresponding piece of power-related equipment.

In other implementations, the EMS may transmit a dispatch schedule to a piece of power-related equipment for the equipment to implement itself. In such cases, transmitting the control parameter value may include transmitting a dispatch schedule including the control parameter value and associated time for applying the control parameter value to the power-related equipment.

The forecasting models and the optimization models of the EMS may be periodically updated. For example, the EMS may include instances of models for which master versions are stored and managed by an EMS manager (such as EMS manager 110 of FIG. 1 or EMS manager 400 of FIG. 4). Each model generally includes one or more model parameters (e.g., coefficients, tuning characteristics, weightings, etc.) that can be modified to adjust performance of the corresponding model. Accordingly, as the EMS manager trains and updates the master version of the models, it may periodically provide updates or otherwise make updates available to EMSs. So, for example, the EMS may receive a model parameter value for a model instance stored at the EMS (e.g., a forecasting model or an optimization model) and, in response to receiving the model parameter value, may update the relevant model according to the received model parameter value.

In at least certain implementations, the EMS may be further configured to transmit operational data obtained from the managed system and other related performance data to the EMS manager. The EMS manager may then use the received data for training and updating the master versions of the models maintained by the EMS manager.

The EMS manager may also be configured to transmit new models to the EMS instead of or in addition to updates to existing models at the EMS. For example, a new optimization model may be developed and stored on the EMS manager, which may then promulgate the new model to one or more EMS managed by the EMS manager such that the new optimization model and its corresponding goal is available for selection and implementation at the EMS.

In at least certain implementations, method 500 may be executed primarily by an application layer of the EMS. More specifically, the EMS may be configured with an application layer that coordinates tasks related to calling and receiving output from the forecasting and optimization models. For example, in response to application layer receiving a command to optimize operation of a managed system, the application layer may first call a forecasting process of the forecasting module, which, in turn executes a forecasting model. On receiving the results of the forecasting model, the application layer may then call an optimization process of the optimization module. The application layer may further provide an interface between the EMS and equipment of the managed system and subsequently transmit control commands (either individually or in the form of a dispatch schedule) to the equipment of the managed system to cause the managed system to operate according to the output of the optimization model.

In the foregoing example, the forecasting model and the optimization model are generally described as relying on operational data (e.g., power consumption and generation data) for the managed system. However, as previously discussed, the models of the EMS may also rely on other data, such as power grid data or weather/environmental data. In the case of power grid data, data relevant to forecasting and optimization and that may be relied upon by models of the EMS may include, without limitation, one or more of cost data for power provided by a power grid coupled to the managed system, emissions data for power provided by the power grid; and demand data for power provided by the power grid. Examples of weather/environmental data relevant to forecasting and optimization may include, without limitation, temperature data for a geographic region including the managed system, wind data for the geographic region, cloud cover data for the geographic region, precipitation data for the geographic region, sunlight data for the geographic region, and daylight data for the geographic region. In any application in which the models of the EMS rely on data outside of the managed system, the method 500 may further include accessing and providing such data to the relevant model and accessing the data may include retrieving or requesting the data from an external data source.

Figure 6:
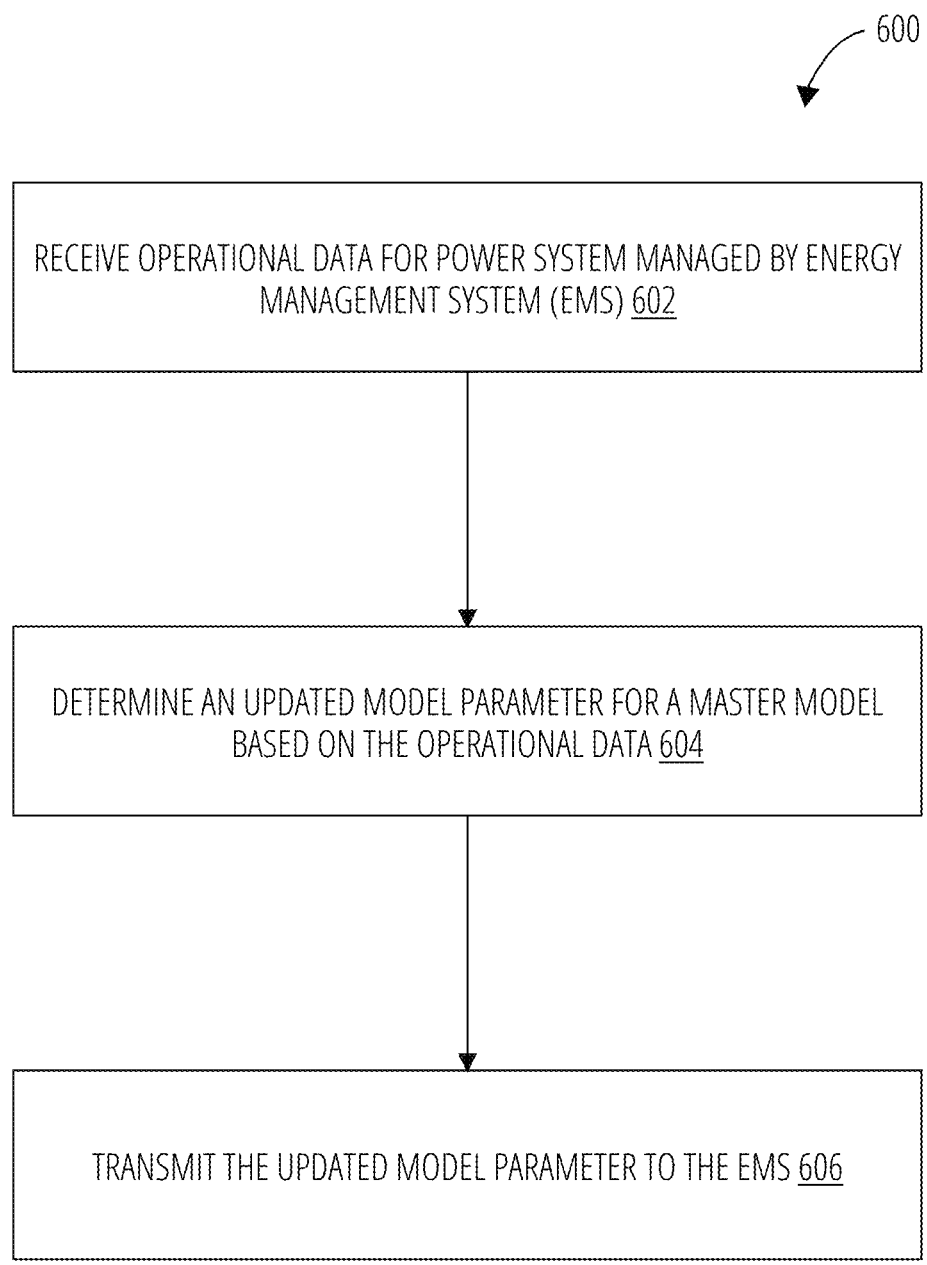
FIG. 6 is a block diagram illustrating a method of dynamically updating and coordinating an EMS, which may be executed by an EMS manager, such as the EMS manager of FIG. 4.

FIG. 6 illustrates an example method 600 for updating and managing models for use in forecasting and optimizing managed systems. Method 600 may be a computer-implemented method executed, for example, by an EMS manage, such as EMS manager 110 of FIG. 1 or EMS manager 400 of FIG. 4. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

At step 602, method 600 includes receiving operational data for a managed system from an EMS according to this disclosure. As previously discussed, such EMSs generally include at least one forecasting model and at least one optimization model. The forecasting model is configured to receive power consumption and generation data for the managed system (and optional external data, such as weather or power grid-related data) and to output predicted power consumption and generation data for a future time period. The optimization model is configured to receive the predicted power and predicted power consumption and generation data provided by the forecasting model and to generate control parameter values for equipment in the managed system. The EMS may then transmit the control parameters values to control the equipment, either as individual control commands or in the form of a dispatch schedule executable by the equipment.

At step 604, method 600 includes determining an updated model parameter for a master model based on the operational data at step 604, where the mast model corresponds to a forecasting model or an optimization model of the EMS.

As previously noted in this disclosure, each of the forecasting model and the optimization model may be one of a plurality of each such model. In the case of the optimization model, each optimization may correspond to a respective optimization goal (e.g., cost reduction, power consumption reduction, emissions reduction). When multiple models are present, the EMS manager may maintain master versions of each model implemented at the EMS.

At step 606, method 600 includes transmitting the updated model parameter to the EMS at step 606. When the updated model parameter is received by the EMS, the EMS applies the updated model parameter to the corresponding model, thereby updating the model to be consistent with the master version maintained by the EMS manager.

In the foregoing example, the EMS managed is described as updating master versions of a forecasting model and an optimization model based on operational data (e.g., power consumption and generation data) for the managed system. However, as previously discussed, such models may also rely on other data, such as power grid data or weather/environmental data. Accordingly, the method 600 may further include the EMS manager obtaining such data, e.g., from an external data source.

Figure 7:
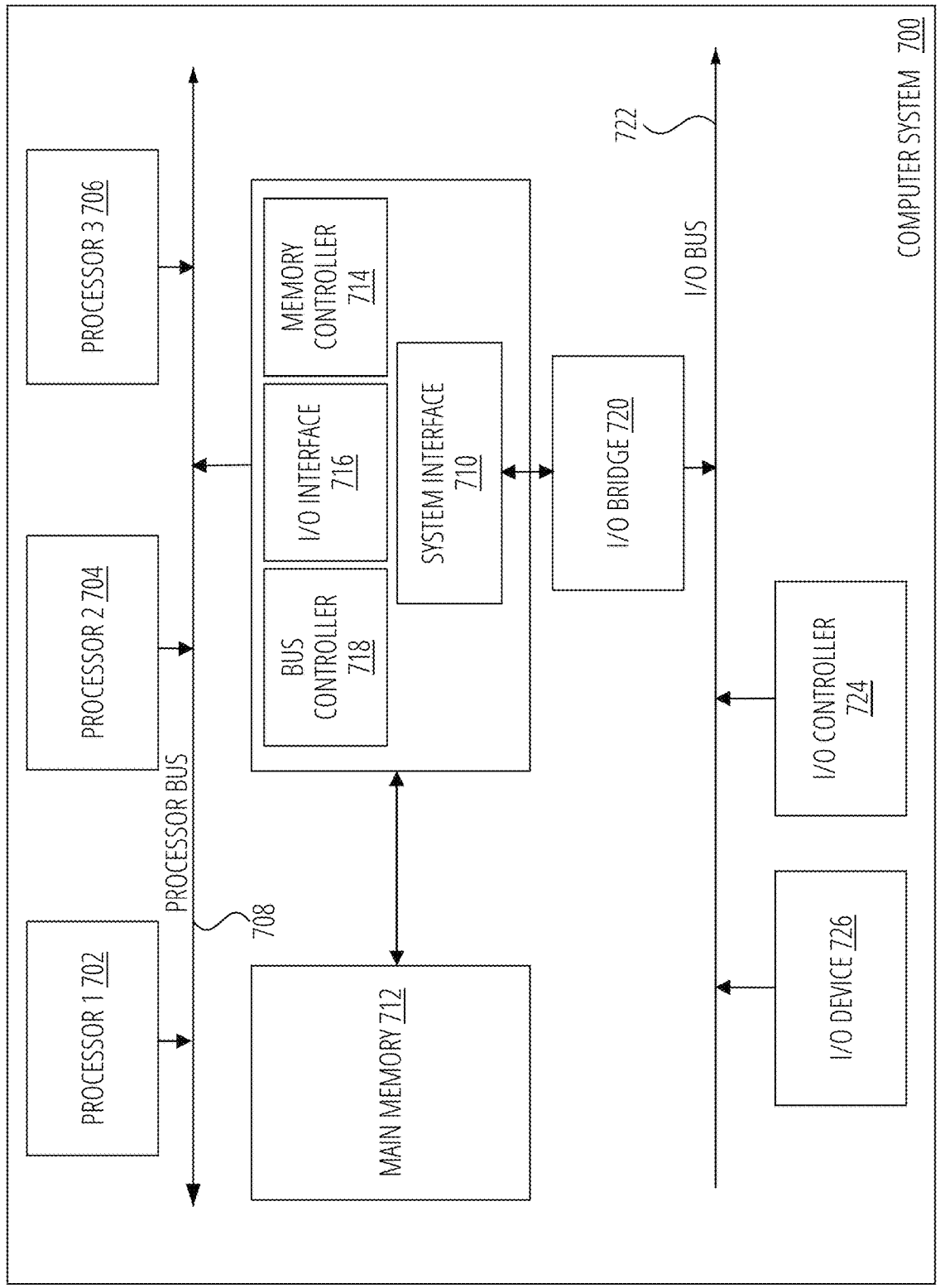
FIG. 7 illustrates an aspect of the subject matter in accordance with one embodiment.

FIG. 7 is a block diagram illustrating an example of a computing device or computer system 700 which may be used in implementing the embodiments of the components of the network disclosed above. For example, the computer system 700 of FIG. 7 may be an EMS or an EMS manager as discussed above. The computer system 700 includes one or more processors. For example, processor 1 702, processor 2 704, and processor 3 706 may include one or more internal levels of cache (not shown) and a bus controller or bus interface unit to direct interaction with a processor bus 708. Processor bus 708, also known as the host bus or the front side bus, may be used to couple the processors with a system interface 710. System interface 710 may be connected to processor bus 708 to interface other components of computer system 700 with processor bus 708. For example, system interface 710 may include a memory controller 714 for interfacing a main memory 712 with processor bus 708. Main memory 712 typically includes one or more memory cards and a control circuit (not shown). System interface 710 may also include an input/output (I/O) interface, such as I/O interface 716, to interface one or more I/O bridges, such as I/O bridge 720, or I/O devices, such as I/O device, with processor bus 708. One or more I/O controllers and/or I/O devices may be connected with an I/O bus 722, such as I/O controller 724 and an I/O device 726, as illustrated.

I/O device 726 may also include an input device (not shown), such as an alphanumeric input device, including alphanumeric and other keys for communicating information and/or command selections to the processors. Another type of user input device includes cursor control, such as a mouse, a trackball, or cursor direction keys for communicating direction information and command selections to the processors and for controlling cursor movement on the display device.

Computer system 700 may include a dynamic storage device, referred to as main memory 712, or a random access memory (RAM) or other computer-readable devices coupled to the processor bus 708 for storing information and instructions to be executed by the processors. Main memory 712 also may be used for storing temporary variables or other intermediate information during execution of instructions by the processors. Computer system 700 may include a read only memory (ROM) and/or other static storage device coupled to processor bus 708 for storing static information and instructions for the processors. The system set forth in FIG. 7 is but one possible example of a computer system that may employ or be configured in accordance with aspects of the present disclosure.

According to one embodiment, the above techniques may be performed by computer system 700 in response to one of the processors executing one or more sequences of one or more instructions contained in main memory 712. These instructions may be read into main memory 712 from another machine-readable medium, such as a storage device. Execution of the sequences of instructions contained in main memory 712 may cause the processors to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 712. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations together with all equivalents thereof.

What is claimed is:

1. A computer-implemented method, comprising:
receiving operational data for a power system managed by an energy management system (EMS), wherein:
an equipment of the power system includes at least one of power generation equipment, power storage equipment, power conversion equipment, and a load; and
the EMS includes a forecasting model configured to receive power consumption and generation data for the power system as input and to output predicted power consumption and generation data; and
the EMS further includes an optimization model configured to receive the predicted power consumption and generation data as input and to output a control parameter value for equipment of the power system according to an optimization goal;
determining an updated model parameter for a master model based on the operational data including power generation data or power consumption data for equipment of the power system wherein the master model corresponds to one of the forecasting model and the optimization model;
transmitting the updated model parameter to the EMS, wherein, when the updated model parameter is received by the EMS, the EMS updates the one of the forecasting model and the optimization model according to the updated model parameter;
receiving power grid data for a power grid electrically coupled to the power system, wherein determining the updated model parameter is further based on the power grid data including at least one of:
cost data for power provided by the power grid;
emissions data for power provided by the power grid; and demand data for power provided by the power grid;
receiving environmental data for a geographic region around the power system wherein: the environmental data including at least one of:
temperature data for the geographic region;
wind data for the geographic region;
cloud cover data for the geographic region;
precipitation data for the geographic region;
sunlight data for the geographic region; and daylight data for the geographic region;
the updated model parameter is further determined and or based on the power grid data; and
wherein the optimization goal includes at least one of energy consumption reduction by the power system, emissions reduction, and cost reduction.

2. The computer-implemented method of claim 1, wherein:
the master model corresponds to the optimization model and the forecasting model, and
the optimization model is one of a plurality of optimization models of the EMS, each optimization model of the plurality of optimization models including a respective optimization goal for generating control parameter values for the equipment of the power system,
the forecasting model is one of a plurality of forecasting models of the EMS, each forecasting model of the plurality of forecasting models configured to predict at least a portion of power consumption and generation for the power system, and
the master model is one of a plurality of master models, each of the plurality of master models corresponding to a respective one of the plurality of optimization and forecasting models.

3. A non-transitory computer-readable storage medium, the computer-readable storage medium including instructions that when executed by a computer, cause the computer to perform a method of claim 1.

* * * * *